(12) United States Patent
Ben-Tsion

(10) Patent No.: US 10,521,399 B1
(45) Date of Patent: Dec. 31, 2019

(54) COMPRESSION CONTROL BASED ON COMPRESSION RATIO ESTIMATION

(71) Applicant: Infinidat LTD., Herzliya (IL)

(72) Inventor: Ido Ben-Tsion, Ness-Ziona (IL)

(73) Assignee: .INFINIDAT LTD, Herzliya (IL)

( * ) Notice: Subject to any disclaimer, the term of this patent is extended or adjusted under 35 U.S.C. 154(b) by 228 days.

(21) Appl. No.: 15/230,454

(22) Filed: Aug. 7, 2016

(51) Int. Cl.
*G06F 16/00* (2019.01)
*G06F 16/174* (2019.01)
*G06F 16/13* (2019.01)

(52) U.S. Cl.
CPC .......... *G06F 16/1744* (2019.01); *G06F 16/13* (2019.01)

(58) Field of Classification Search
CPC ........... G06F 17/30067; G06F 16/1748; G06F 16/1744; G06F 16/13
USPC .................................................. 707/661, 693
See application file for complete search history.

(56) References Cited

U.S. PATENT DOCUMENTS

| | | | |
|---|---|---|---|
| 7,966,296 B2 * | 6/2011 | Isobe | G06F 17/30067 707/661 |
| 2008/0025298 A1 * | 1/2008 | Lev-Ran | H04L 69/04 370/389 |
| 2008/0301164 A1 * | 12/2008 | Isobe | G06F 17/30067 |
| 2013/0198148 A1 * | 8/2013 | Chambliss | G06F 16/1748 707/692 |

\* cited by examiner

*Primary Examiner* — Vincent F Boccio
(74) *Attorney, Agent, or Firm* — Reches Patents

(57) ABSTRACT

A method for controlling compression based on compression ratio, the method includes monitoring access requests related to a storage entity of a storage system; wherein the access requests are associated with multiple data units; evaluating a compression ratio related to the storage entity; wherein the evaluating comprises applying a first compression process on at least a subset of the multiple data units to provide first compressed data units; serving the access requests without storing, in a permanent storage layer of the storage system, the first compressed data units; and reacting, by the storage system, to the compression ratio.

24 Claims, 2 Drawing Sheets

200

COMPRESSION CONTROL BASED ON COMPRESSION RATIO ESTIMATION

BACKGROUND

Data compression is often used by storage systems to reduce storage space usage and storage cost.

Compression can be applied to selected storage entities (storage devices, logical volumes or file systems). Data stored in a storage system can be written by different sources/applications and may have various data characteristics with different compressibility. Thus, different storage entities, once compressed, may achieve different compression ratio. Some storage entities may achieve poor compression ratio, either because the original data is already compressed (e.g., compressed video) or because of other characteristics of the data.

Compressing a storage entity is an intensive process that consumes vast computing resources. Compressing data as part of the storing process is also resource consuming that affects the performance of the storage system.

Therefore, selecting storage entities for compression should be done with caution.

SUMMARY

According to an embodiment of the invention there may be provided a method, device and non-transitory computer readable medium as included in the claims and/or the drawings and/or the specification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
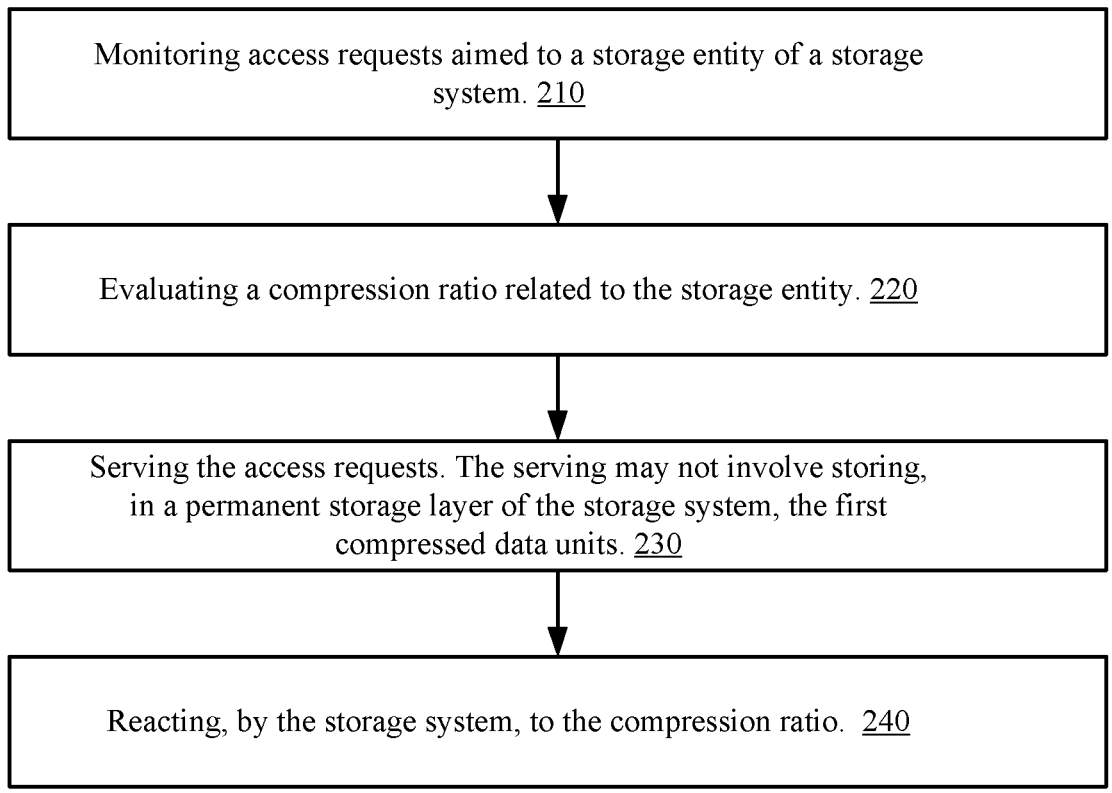
FIG. 1 illustrates a method according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate correlating or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following non-transitory computer readable medium, method and system may provide an estimation for the compression ratio that can be achieved for a certain uncompressed storage entity (a volume, a portion of a volume, a storage drive, a filesystem) if will be compressed. The method is performed by a storage system that includes the storage entity, by exploiting access requests directed towards the storage entity and coming from client computers that are coupled to the storage system. There is no need to initiate read requests solely for the purpose of compressing. The estimation keeps being updated and improved over time and becomes more accurate, as more access requests are handled. The compressed data is not saved and the stored data is not altered. Only a compression ratio average of the storage entity is being handled and updated upon each access request.

Suppose a certain volume (that is not currently compressed) is being monitored for compression ratio estimation. The monitoring may be initiated by a user of the storage system, or the monitoring may be automatically activated to all uncompressed storage entities, so as to recommend activating compression when an opportunity for high compression rate is detected for a monitored storage entity.

A value that counts an average of compressed ratio for the certain volume (hereinafter, compression ratio average) is being updated upon each access request, so as to reflect the compression ratio of the storage entity. Access requests (e.g., read requests, write requests, or both), directed towards the certain volume and coming from an accessing entity (host, storage client) that is coupled to the storage system, are tracked and the data unit that is read or written in response to the request is compressed (without being saved). The size of the compressed data unit is compared to the size of the data unit before compression and the calculated ratio is weighted to combine with the compressed ratio average of the certain volume. A higher weight may be given to compression ratios calculated for data units of newer access requests over compression ratios calculated for data units of previous or older access requests, so the compression ratio average is adapted to new contents of the storage entity, in case where the certain storage entity is a dynamic storage entity that is rewritten constantly.

When it is estimated that the compression ratio average represents an adequate sample of the address space of the certain volume, then the compression ratio average can be published to the user as the predicted compression ratio that will be gained if the certain volume is compressed.

The compression ratio average can be displayed in a user interface display in association with the certain storage entity. An adequate sample can be a sample that covers at least a certain percentage of the address space of the volume, or counts at least certain number of access requests, and/or covers at least one address range in each region of the storage entity, etc.

Examples: sample that represents 10% of the address space of the storage entity (i.e., 10% of the volume was compressed to obtain the compression rate average), a sample that represents 100M access requests towards the storage entity, a sample that covers at least one data unit in every one megabyte of the storage entity, etc.

The calculating of the compression ratio upon access requests may be performed only when the system resources allows it. When the storage system is overloaded, the calculating of the compression ratio may be skipped or may be performed only to certain percentage of the access requests. For example, the calculating may be skipped when the storage system handles more than a certain number of I/O requests per second or when the resources (CPU, memory) of the storage system are intensively consumed.

In order to reduce the computation resources consumed by the compression of data units, a light weight compression algorithm can be used, i.e., algorithm that does not consume too much time and system resources and produces a fair size reduction, rather than a heavy-weight algorithm that produces substantial size reduction but consumes system resources and influences the performance of the system.

Estimation can be used for a compression ratio that could have been achieved by a heavy-weight compression, if was activated, based on the results of the light weight algorithm that was actually activated.

For example, if a fast compression algorithm obtains 40% saving for a certain data unit, and a heavy-weight compression algorithm is expected to improve this average saving by 25% compared to the fast compression algorithm, then it can be assumed that if the slower compression algorithm will be implemented then the certain data unit will be compressed by 50% (40%*1.25).

FIG. 1 illustrates a method 200 according to an embodiment of the invention.

Method 200 may start by step 210 of monitoring access requests aimed to a storage entity of a storage system. The access requests are associated with multiple data units. The access requests may include read and/or write requests. The access requests are initiated by applications running on a host that is coupled to the storage system. The applications and the host may not be aware of whether or not the data units are stored as compressed or non-compressed and the data read by the access requests (read requests) is not intended for compressing by the host or by the application.

A data unit may include one or more bits that are stored in the storage system or intended to be stored in the storage system (the latter is when the access request is a read request) and includes user's content, such as content written by applications running on servers that are coupled to the storage system.

The monitoring may be executed by the storage system or by another device that monitors traffic from and/or to the storage system.

Step 210 may be followed by steps 220 and 230.

Step 220 may include evaluating a compression ratio related to the storage entity. The evaluating may include applying a first compression process on the multiple data units or on a subset of the multiple data units to provide first compressed data units. The evaluating of step 220 may be done on data units that are associated to access requests that are aimed to the storage system as a part of the storage services provided by the storage system—and may not require the exchange of data units that are aimed solely for evaluation of the compression ratio—thereby reducing the amount of data units exchanged with the storage system and enable to evaluate the compression ratio on larger amounts of data units.

Step 220 may include selecting the subset of the multiple data units ("subset") in order to evaluate the compression ratio that can be achieved when compressing the entire storage entity or a portion thereof.

Step 220 may include evaluating the compression ratio that will be obtained when compressing the data units of the storage entity based on the applying of the first compression process.

The selecting of the subset can be done in any manner. The selecting can be based on at least some of the following parameters: the resources available for the execution of step 220 (this may be responsive to the status of computational resources of the storage system—whether these resources are occupied or not), to the size of the storage entity (larger storage entities may associated with larger subsets), to the priority of the data units stored in the storage volume (higher priority data may be associated with a larger subset—to provide more accurate estimation of the compression ratio), and the like.

Step 220 may include determining that the subset forms an adequate statistical sample that represents all the data units of the storage entity, in terms of compression ratio. It can be determined that the subset forms a representing sample if an expected statistical error (for example—a standard error) is less than a certain value (e.g., 5%). The statistical error relates to the relation between the compression ratio achieved when compressing the subset and the compression ratio that would have been achieved if the entire storage entity had been compressed. The calculation of the statistical error can be concluded from: the ratio between the number of the data units of the subset and the total number of data units of the storage entity, from the distribution of the at data units of the subset across the entire storage entity, and so on.

Steps 220 and even step 210 may be triggered by the storage system. The storage system may trigger the execution of steps 210 and/or 220 in a predefined manner (for example periodical manner), in a random manner, in a pseudo-random manner and/or in response to the status of the storage system resources, and the like.

For example, the storage system may trigger method 200 when there is a memory resource shortage, when there is less load on the computational resources of the storage system, and the like.

Steps 210 and 220 may be preceded by a step (not shown) of receiving a request to evaluate a compression ratio related to the storage entity, wherein the request is initiated by a management station that is coupled to (or belong to) the storage system. Alternatively, the storage system can decide autonomously to evaluate compression ratios of all non-compressed storage entities, or of selected storage entities, e.g. storage entities that do not require high performance, and the like.

Step 230 may include serving the access requests. For example: if the access request is a read request—provide the requested data unit, while if the access request is a write request—writing the data unit in its uncompressed form.

Step 230 may not involve storing, in a permanent storage layer of the storage system, the first compressed data units—especially when the first compressed data units are used for evaluation of the compression only. Alternatively—step 230 may include storing the first compressed data units in the permanent layer—as long as the burden imposed on the storage system is below a predefined threshold.

Step 230 may be executed regardless of step 220. Especially, step 230 should not be delayed (or may be delayed by a predefined amount) due to the execution of step 220.

Step 220 may be regarded as having a lower priority then step 230 and the execution of step 220 may be delayed or even waived based on various parameters such as the load imposed on the computational and/or memory resources of the storage system. In a sense step 220 may be executed as a background process.

Step 220 may be followed by step 240 of reacting, by the storage system, to the compression ratio.

Step 240 may include at least one out of (a) determining to compress the data units related to the storage entity, (b) compressing the data units aimed to the storage entity, (c) informing one or more computerized device (e.g., a management station, a host, a client computer) about the compression ratio obtained during step 220, (d) determining that one or more computerized devices (that differ from the storage system) should compress the data units before sending the data units to the storage system, and the like, and/or (e) requesting from the one or more computerize devices (that differ from the storage system) to compress the data units before sending the data units to the storage system.

Step 240 may include determining to apply the second compression process when the compression ratio exceeds a predefined compression ratio threshold. The predefined compression ratio threshold may be set as a tradeoff between the benefits from compressing data units related to the storage entity and the cost associated with the compression. For example—if compressing the entire data units related to the storage entity consumes many resources and the compression ratio is low step 240 may decide not to apply the second compression process.

Step 240 may be performed if it is determined that the subset or the multiple data units form an adequate statistical sample that represents all the data units of the storage entity, with respect to compression ratio.

Compression may be applied when the compression ratio obtained during step 220 is within a desired range.

Step 240 may include determining a manner of compression of the data units.

For example, step 240 may include determining (or requesting) to apply the compression on all of the data units related to the storage entity, to data units that are sent to the storage system at certain periods of time or at certain points in time (for example compressing only future data units that are received after the determination, compressing data units received after or before a certain period from the determining).

The determining may include selecting compression processes and the like. Different compression processes may provide different tradeoffs between compression efficiency and storage system resource consumption levels and the selection may be based on these tradeoffs. Additionally or alternatively, different compression processes may better fit different types of data units—and the selection may also be based on the type of data units.

Step 240 may include determining or requesting to apply a second compression process on data units of the storage entity to provide second compressed data units and storing the second compressed data units in the permanent layer of the storage system.

The first compression process may equal the second compression process or may differ from the second compression process.

The first compression process may consume less, more or that same computational resources of the storage system in comparison to the second compression process.

When the first and second compression processes differ from each other the method may include receiving or generating a relationship between the compression ratio obtained by the first compression process and the compression ratio obtained by the second compression ratio. This relationship is required in order to evaluate whether to apply the second processing process on data units based on the outcome of step 220.

This relationship allows to evaluate the compression ratio of the second compression process based on the applying of the first compression process.

Step 220 may be executed before determining to compress the content of the storage entity, after determining to compress the content entity, and/or after determining to stop compressing the content of the storage entity.

For example, step 220 may be executed after determining to compress the content—in order to provide an on-going compression evaluation.

Steps 210 and 220 may be executed during one or more periods of time of any duration. Longer durations may provide more accurate feedback as more information is gained about the compression ratio. More weight may be assigned to the compression ratio achieved when compressing newly written data units—thereby adapting to changes in these data units.

Method 200 may be repeated multiple times (providing multiple iterations).

Different iterations of method 200 may involve changing a compression ratio evaluation parameter from one iteration to another, maintaining the same compression ratio evaluation parameter during consecutive iterations and the like. A compression ratio evaluation parameter affects the manner of execution of step 220. For example—the compression ratio evaluation parameter may determine whether to compress the multiple data units or the subset, may determine how the subset is selected, may determine the size of the subset, may determine the first compression process, and the like.

The compression ratio may be updated during the multiple iterations. Step 220 may include updating, during a certain iteration of the multiple iterations, the compression ratio based on one or more compression ratios calculated during at least one other iteration that preceded the certain iteration Assuming that step 240 includes (i) informing one or more computerized device about the compression ratio obtained during step 220 and/or requesting from the one or more computerize devices (that differ from the storage system) to compress the data units before sending the data units to the storage system—then step 240 may be followed by steps 244 and 246.

Step 244 may include receiving a response from the computerized device. The response may indicate whether all or at least some of the data units that are associated with the storage entity should be compressed.

If the response includes a request to compress the data units associated with the storage entity then step 244 may be followed by step 246 of compressing the data units based on the response.

Figure 2:
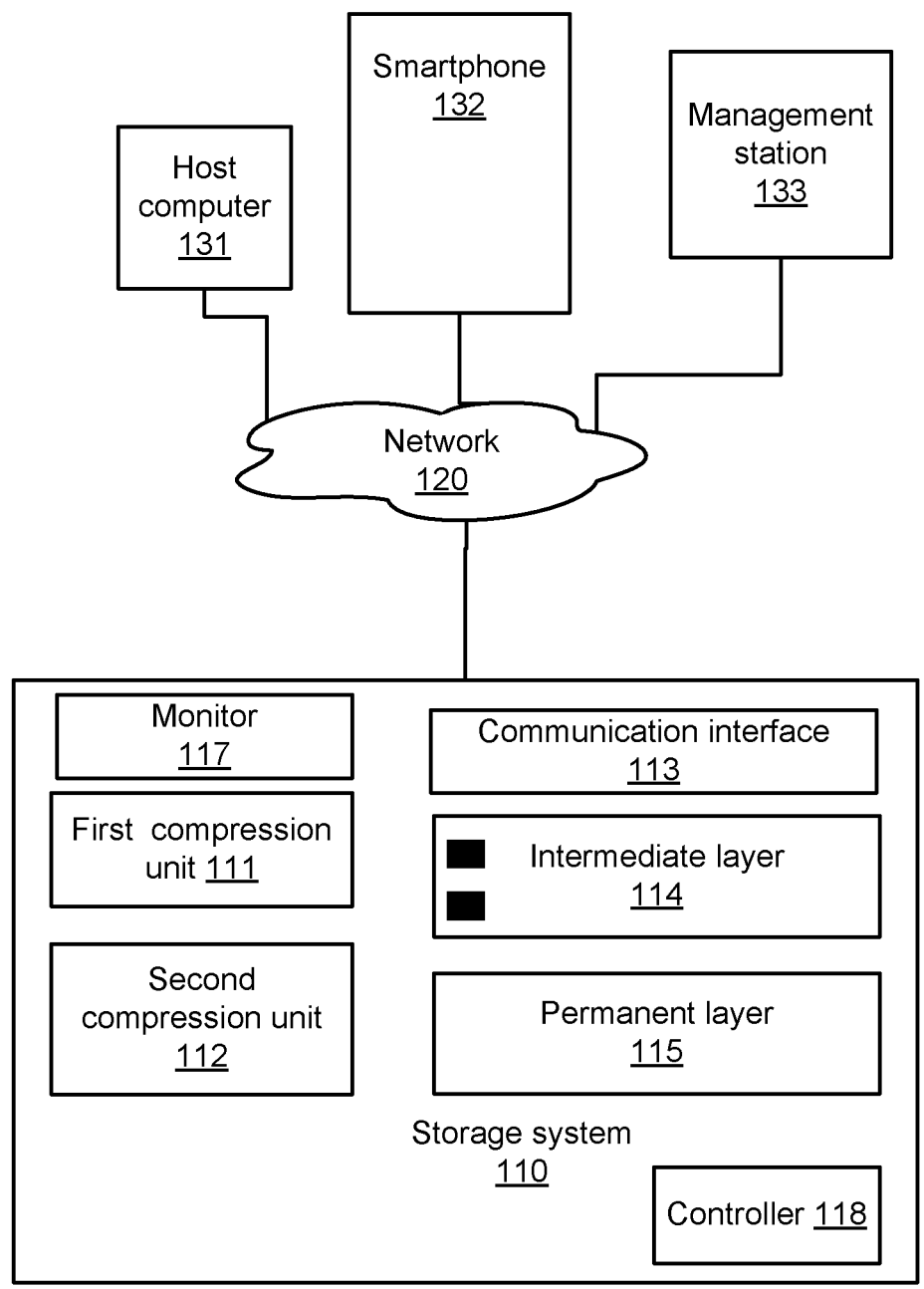
FIG. 2 illustrates a storage system, a network and various computerized devices that are coupled to the network according to an embodiment of the invention.

FIG. 2 illustrate a storage system 110, network 120, and computerized devices such as host computer 131, smartphone 132 and management station 133 according to an embodiment of the invention.

Network 120 is coupled to storage system 110, host computer 131, smartphone 132 and management station 133.

Host computer 131, smartphone 132 and management station 133 are merely non-limiting examples of devices that may to perform at least one of the following (i) send access requests to the storage system, (ii) receive the outcome of step 240 from the storage system, (iii) monitor the access requests during step 210, (iv) request, based on the outcome of step 220 to compress the data units associated with the storage entity, and the like.

Storage system 110 is illustrated as including (a) communication interface 113 for interfacing with network 120 and/or for monitoring traffic, (b) permanent layer 115 aimed to store data units for long duration. The permanent layer may include one or more types of nonvolatile memories such as disks, solid state device (SSD) memory units, and the like, (c) intermediate layer 114 for storing data units before being stores in the permanent layer and/or after being fetched from permanent layer, (d) first compression unit 111 for executing step 220, (e) second compression unit 112 for compressing data units when step 240 determines to compress these data units, (f) controller 116 for executing step 240 and/or for controlling and/or executing other steps of method 200, (g) monitor 117 for monitoring access requests aimed to a storage entity of a storage system.

Monitor 117 may be coupled to communication interface 113 or belong to communication interface 113. Monitor 117 may be a sniffer, a processor, a probe or any other hardware component capable of monitoring.

The first and second compression units 111 and 112 may be integrated or may be the same compression unit that is configured differently at different points in time.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for controlling compression based on compression ratio estimation, the method comprises:
   monitoring access requests directed to a storage entity stored in a storage system; wherein the access requests are associated with multiple data units;
   estimating, without compressing the storage entity, a compression ratio obtainable when compressing the storage entity; wherein the estimating comprises applying a first compression process on at least a subset of the multiple data units to provide first compressed data units;
   serving the access requests without storing, in a permanent storage layer of the storage system, the first compressed data units; wherein the serving of the access requests is executed in parallel to the estimating of the compression ratio unless the estimating of the compression ratio is delayed or waived; and
   reacting, by the storage system, to the compression ratio, when it is determined that the subset of the multiple data units form a statistical sample that represents the storage entity.

2. The method according to claim 1, comprising performing multiple iterations of the monitoring, estimating, serving and reacting.

3. The method according to claim 2 comprising updating, during a certain iteration of the multiple iterations, the compression ratio based on at least one compression ratio calculated during at least one other iteration that preceded the certain iteration.

4. The method according to claim 1, wherein the estimating of the compression ratio is triggered by the storage system.

5. The method according to claim 1, comprising selecting the subset of the multiple data units based on a status of computational resources of the storage system.

6. The method according to claim 1, comprising selecting the subset of the multiple data units based on a size of the storage entity.

7. The method according to claim 1, comprising selecting the first compression process out of multiple compression processes.

8. The method according to claim 7, wherein the multiple compression processes differ from each other by storage system resource consumption level and wherein the selecting of the compression process is responsive to a status of resources of the storage system.

9. The method according to claim 1, wherein the reacting to the compression ratio comprises determining whether to apply a second compression process on data units of the storage entity to provide second compressed data units and to store the second compressed data units in the permanent layer of the storage system.

10. The method according to claim 9, comprising determining to apply the second compression process when the compression ratio exceeds a predefined compression ratio threshold.

11. The method according to claim 9, wherein the first compression process equals the second compression process.

12. The method according to claim 9, wherein the first compression process differs from the second compression process.

13. The method according to claim 9, wherein the first compression process consumes less computational resources of the storage system in comparison to the second compression process.

14. The method according to claim 9, wherein the estimating of the compression ratio comprises evaluating the compression ratio of the second compression process based on the applying of the first compression process.

15. The method according to claim 1, wherein the reacting to the compression ratio comprises sending compression ratio information to a computerized device that is coupled to the storage system.

16. The method according to claim 15, wherein the reacting to the compression ratio comprises receiving a response from the computerized device; wherein the response indicates whether to compress future data units that are associated with access requests received after the determining and are aimed to the storage entity; and compressing the future data units based on the response.

17. The method according to claim 1 comprising determining whether to delay or waive the estimating of the compression ratio based on a load imposed on at least one out of computational resources and memory resources of the storage system.

18. The method according to claim 1 comprising serving the access requests regardless of an execution of the estimating of the compression ratio.

19. The method according to claim 1, comprising selecting the subset of the multiple data units that covers at least one address range in each region of the storage entity.

20. The method according to claim 1, wherein the estimating of the compression ratio comprises assigning more weight to compression ratio achieved when compressing newly written data units in comparison to weight to compression ratio achieved when compressing written data units that were written before the newly written data units.

21. The method according to claim 1, wherein the reacting comprises requesting one or more computerized devices that differ from the storage system to compress data units sent from the one or more computerized devices before sending the data units to the storage system.

22. A non-transitory computer readable medium that stores instructions that once executed by a storage system cause the storage system to execute the steps of: monitoring access requests directed to a storage entity stored in a storage system; wherein the access requests are associated with multiple data units; estimating, without compressing the storage entity, a compression ratio related to obtainable when compressing the storage entity; wherein the estimating comprises applying a first compression process on at least a subset of the multiple data units to provide first compressed data units; serving the access requests without storing, in a permanent storage layer of the storage system, the first compressed data units; wherein the serving of the access requests is executed in parallel to the estimating of the compression ratio unless the estimating of the compression ratio is delayed or waived; and reacting, by the storage system, to the compression ratio when it is determined that the subset of the multiple data units form a statistical sample that represents the storage entity.

23. A storage system comprising a permanent layer, a monitor, a first compression unit and a controller; wherein the monitor is configured to monitor access requests directed to a storage entity stored in a storage system; wherein the access requests are associated with multiple data units; wherein the controller is configured to estimate, without compressing the storage entity, a compression ratio obtainable when compressing the storage entity; wherein the estimating comprises applying, by the first compression unit, a first compression process on at least a subset of the multiple data units to provide first compressed data units; wherein the storage system is configured to serve the access requests without storing, in a permanent storage layer of the storage system, the first compressed data units; wherein the serving of the access requests is executed in parallel to the estimating of the compression ratio unless the estimating of the compression ratio is delayed or waived; and wherein the storage system is configured to react to the compression ratio, when it is determined that the subset of the multiple data units form a statistical sample that represents the storage entity.

24. The storage system according to claim 23 wherein a second compression unit of the storage system is configured to apply a second compression process on data units of the storage entity when it is determined to react to the compression ratio by compressing the data units.

* * * * *